(No Model.)
A. C. LEMM.
SHEARS.
No. 572,644. Patented Dec. 8, 1896.
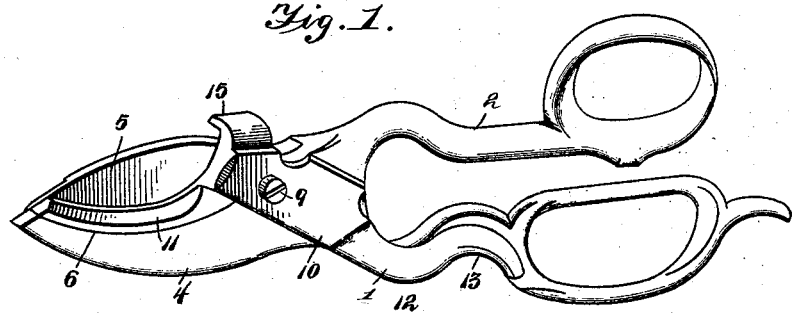
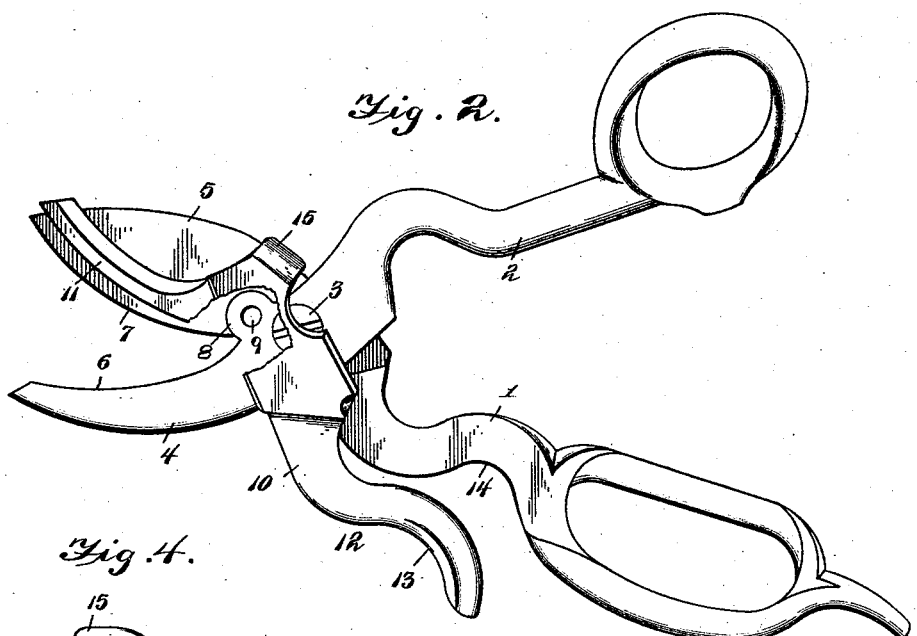
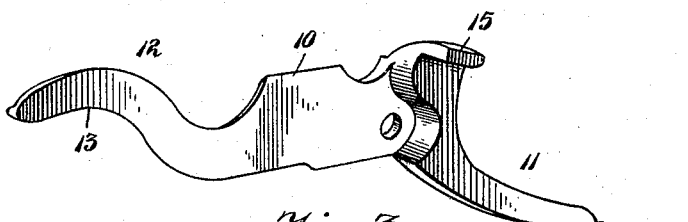
Witnesses
T. W. Riley
Rex. Smith
Inventor
Adolph C. Lemm.
By his Attorneys,
C. A. Snow & Co.

UNITED STATES PATENT OFFICE.

ADOLPH C. LEMM, OF CLYDE, OHIO.

SHEARS.

SPECIFICATION forming part of Letters Patent No. 572,644, dated December 8, 1896.

Application filed February 20, 1896. Serial No. 580,026. (No model.)

*To all whom it may concern:*

Be it known that I, ADOLPH C. LEMM, a citizen of the United States, residing at Clyde, in the county of Sandusky and State of Ohio, have invented a new and useful Shears, of which the following is a specification.

This invention relates to an improvement in shears, and is designed especially for use in clipping flowers, fruit, &c.

The object of the present invention is to provide in connection with a pair of shears an attachment in the nature of a clutch which is pivotally connected to one of the shear-blades and is adapted to be operated simultaneously with the closing of the cutting-jaws, the said clutch coöperating with one of the shear-jaws to clamp the stem of each particular piece of fruit or the flower, as the case may be, and to hold the same firmly during the operation of severing the stem, whereby, after severance is effected, the stem will be still retained by the clutch and so held until the jaws are moved apart, whereupon the stem will be released and the flower or piece of fruit may be deposited in the proper receptacle, thus requiring the use of but one hand.

The invention consists in certain novel features and details of construction and arrangement of parts, as hereinafter fully described, illustrated in the drawings, and finally pointed out in the claims.

In the accompanying drawings, Figure 1 is a perspective view of the improved clipping-shears closed. Fig. 2 shows the same in elevation with the jaws open. Fig. 3 is a detail perspective view of the pivoted clutch. Fig. 4 is an enlarged detail section taken through the shears in advance of their pivot.

Similar numerals of reference designate corresponding parts in the several figures of the drawings.

Referring to the accompanying drawings, 1 and 2 designate the shear-handles, one of which is provided with the usual bow for the thumb and the other with a bow for one or more of the fingers. These handles may be of any suitable length and are pivoted together at 3 in the usual manner, at which point they cross each other and beyond which point they are extended to form the shearing blades or jaws 4 and 5.

One of the shearing-jaws, 4, is of segmental form, being provided with a concaved inner edge 6, which transversely is flat or at right angles to the side faces of the jaw to form an abutting surface for the clutch hereinafter described. The other shear-jaw, 5, has a convex cutting edge 7, which coöperates with the concaved edge of the jaw 4 to effect a shearing cut.

The jaw 4 is provided just in advance of its pivotal connection with the jaw 5 with a perforated ear 8, which is threaded to receive the pivotal screw 9 of a clutch 10, which is thereby pivotally connected to the jaw 4. This clutch comprises, essentially, a segmental clamping-jaw 11, having a convex and flat clamping-surface which corresponds to and is adapted to abut evenly against the concaved inside edge of the jaw 4, above described. The clutch 10 is also extended in rear of its pivot or in the direction of the hand to form a finger-lever or handle portion 12, whereby it may be vibrated. This lever or handle portion 12 is of ogee or sinuous form in order to afford a hook or finger-rest 13 for the reception of the index finger of the hand, and that handle of the shears to which the clutch handle or lever 12 is adjacent is correspondingly shaped to form a recess or rest 14 for the index finger. The clutch is further provided in proximal relation to its pivot and at one side thereof with a transverse extension or stop 15, which extends across the outer convex edge of the shear-jaw 5, and is operated upon thereby when the jaws are moved apart for the purpose of moving the clutch away from the jaw 4.

In the operation of clipping or severing a stem the jaws are moved apart, as shown in Fig. 2, and caused to straddle the stem. Upon closing the jaws the clutch 10 is manipulated at the same time and clamps such stem against one of the shear-jaws, as above described. The stem is thus firmly held while the cutting blades or jaws are severing it, and after the stem is entirely severed its end is still held by the clutch, thus suspending the flower or fruit from the shears until the jaws are moved apart, whereupon the article may be deposited in the proper receptacle. Upon opening the shears the clutch is automatically thrown away from the jaw in conjunction with which it acts.

The device is very simple in construction, consists of few parts, and dispenses entirely with the necessity for springs and other delicate parts.

The improvement may of course be applied to shears of any size, and various changes in the form, proportion, and minor details of construction may be resorted to without departing from the spirit or sacrificing any of the advantages of this invention.

Having thus described the invention, what is claimed as new is—

1. The combination with a pair of shear-blades pivotally connected and provided with handles as described, of a clutch pivotally connected to one of said blades at a point between its pivot and point, the said clutch being extended back of its pivot to form a handle which projects within reach of the operator's finger and is capable of moving independently of either shear-blade handle in both directions, whereby the blades may be partially opened before the clutch is released, substantially as described.

2. The combination with a pair of shear-blades pivotally connected and provided with handles as described, of a clutch pivotally connected to one of said blades at a point between its pivot and point, a handle extension on said clutch by means of which it may be operated independently of the shear-blade handles, and a lateral extension or stop-lip on said clutch located between the pivot of the shear-blades and their points and crossing the plane of the blade opposite that to which it is pivoted, the arrangement being such that a limited opening of the blades may be effected before the clutch is released, substantially as and for the purpose described.

In testimony that I claim the foregoing as my own I have hereto affixed my signature in the presence of two witnesses.

ADOLPH C. LEMM.

Witnesses:
H. G. GIBBONS,
MAUD GIBBONS.